US011254422B2

United States Patent
Heid et al.

(10) Patent No.: US 11,254,422 B2
(45) Date of Patent: Feb. 22, 2022

(54) SYSTEM AND METHOD FOR REDUCING AIRCRAFT BRAKE WEAR

(71) Applicant: Hydro-Aire, Inc., Burbank, CA (US)

(72) Inventors: Franklin Michael Heid, Santa Clarita, CA (US); David Deloria, Santa Clarita, CA (US)

(73) Assignee: Hydro-Aire, Inc., Burbank, CA (US)

( * ) Notice: Subject to any disclaimer, the term of this patent is extended or adjusted under 35 U.S.C. 154(b) by 125 days.

(21) Appl. No.: 16/709,584

(22) Filed: Dec. 10, 2019

(65) Prior Publication Data
US 2020/0189729 A1    Jun. 18, 2020

Related U.S. Application Data

(60) Provisional application No. 62/780,134, filed on Dec. 14, 2018.

(51) Int. Cl.
*F16D 65/00* (2006.01)
*F16D 65/847* (2006.01)
(Continued)

(52) U.S. Cl.
CPC ................ *B64C 25/42* (2013.01); *B08B 3/08* (2013.01); *B60T 8/18* (2013.01); *B60T 8/325* (2013.01);
(Continued)

(58) Field of Classification Search
CPC ............. F16D 65/0031; F16D 65/0037; F16D 65/0025; F16D 65/0043; F16D 65/847; B64C 25/42
See application file for complete search history.

(56) References Cited

U.S. PATENT DOCUMENTS 2,821,437 A * 1/1958 Lesher ............... F16D 65/847
                                              239/403
3,664,467 A * 5/1972 Lucien ............... F16D 65/847
                                              188/71.6
(Continued)

FOREIGN PATENT DOCUMENTS

DE    102005047351 A1 *  4/2007  ............... B60T 1/02
FR         1383257 A  * 12/1964  ............ B60K 11/00
JP         07012154 A  *  1/1995  ......... F16D 65/0031

OTHER PUBLICATIONS

EPO translation, FR 1383257 A. (Year: 1964).*
Dialog translation, JP 07012154 A. (Year: 1995).*

*Primary Examiner* — Thomas J Williams
(74) *Attorney, Agent, or Firm* — Fulwider Patton LLP

(57) ABSTRACT

A system and method are provided for continuous monitoring and controlling of aircraft braking that can reduce brake wear and aircraft operating costs through the retention of carbon brake powder from the brakes or addition of carbon powder in a device mounted with respect to the brake disc stack. The use of carbon powder reduces brake wear by providing small particles between the brake discs, acting as a buffer between the brake discs when the brake stack is clamped together. Moreover, when carbon powder or small particles are used at application, such use reduces the roughness of the carbon surface and reduces the number of large particles from braking off the carbon surface, thereby reducing brake wear. Adaptive or selective braking may be used in conjunction with carbon powder to further reduce carbon brake wear.

18 Claims, 5 Drawing Sheets

(51) Int. Cl.
   *B64C 25/42*   (2006.01)
   *B60T 8/18*    (2006.01)
   *B60T 8/32*    (2006.01)
   *B08B 3/08*    (2006.01)

(52) U.S. Cl.
   CPC ..... *F16D 65/0031* (2013.01); *F16D 65/0037* (2013.01); *F16D 65/0043* (2013.01); *F16D 65/847* (2013.01)

(56) References Cited

U.S. PATENT DOCUMENTS

| | | | | |
|---|---|---|---|---|
| 4,923,056 | A * | 5/1990 | Nedelk | B60T 8/325 |
| | | | | 188/151 R |
| 5,845,975 | A * | 12/1998 | Wells | B60T 7/16 |
| | | | | 303/126 |
| 6,357,563 | B1 * | 3/2002 | Hayford | F16D 65/847 |
| | | | | 188/264 A |
| 6,478,252 | B1 * | 11/2002 | Stimson | B60T 8/00 |
| | | | | 188/16 |
| 9,097,301 | B2 * | 8/2015 | Pahle | F16D 65/18 |
| 2002/0166311 | A1 * | 11/2002 | Maricq | F16D 65/00 |
| | | | | 55/385.3 |
| 2003/0155443 | A1 * | 8/2003 | Ace-Kirker | F16D 55/00 |
| | | | | 239/550 |
| 2011/0226569 | A1 * | 9/2011 | Devlieg | B60T 8/1703 |
| | | | | 188/158 |
| 2013/0092787 | A1 * | 4/2013 | Polubinski | B64C 25/42 |
| | | | | 244/50 |
| 2018/0044537 | A1 * | 2/2018 | Poteet | C04B 41/524 |
| 2018/0170816 | A1 * | 6/2018 | Poteet | C04B 35/78 |
| 2018/0252278 | A1 * | 9/2018 | Naitou | F16D 55/40 |
| 2019/0249730 | A1 * | 8/2019 | Wagner | B60T 1/06 |

* cited by examiner

SYSTEM AND METHOD FOR REDUCING AIRCRAFT BRAKE WEAR

CROSS-REFERENCES TO RELATED APPLICATIONS

This application claims priority from U.S. Application No. 62/780,134, filed Dec. 14, 2018, the content of which is fully incorporated herein by reference.

BACKGROUND

This invention generally relates to an apparatus and method for reducing aircraft brake wear, and more particularly to an apparatus and method for reducing carbon brake wear over a variety of braking conditions.

Modern aircraft may be equipped with carbon brakes on each of the main landing gear wheels. Carbon brakes are preferred over their steel counterparts because of their reduced weight and enhanced performance characteristics. Carbon brakes generally comprise a piston housing including pistons, a torque tube, and a carbon brake stack. The carbon brake stack is made up of several discs (stators) that are keyed to the stationary torque tube, and interleaved discs (rotors) that are keyed to the inside rim of the wheel and rotate with the wheel. The stack is bounded by the piston housing and a pressure plate on one side, and a backing plate on the other side that compress the stators and rotors. Friction braking occurs when the piston compresses the brake stack, such that the resulting friction decreases the wheel speed and consequently the aircraft speed. The friction energy from the braking is converted largely to heat during the braking.

It is recognized that a significant amount of carbon brake disc wear occurs during taxiing, where a more prevalent number of brake applications are required to maintain the appropriate speed parameters and account for taxi way traffic. The increased brake wear occurs due to the fact that the carbon brake surfaces are extremely abrasive, and when the stack is first pressed together the interaction of the mating two abrasive surfaces can cause carbon pieces to dislodge. These pieces are captured between the discs, and can themselves cause further erosion of the carbon surfaces. As these pieces are ground down to particulate, the abrasive conditions diminish. When the brake is released, the cooperating friction surfaces move apart and much of the particulate dust falls away.

While repeated applications of the brakes continue this process, when the rotors and stators are first pressed together, the unheated carbon surfaces are more susceptible to having larger particles worn off of the surfaces. Conversely, after the carbon surfaces have been heated by the braking action, there is a much lower propensity for these particles to break off. Loss of the larger particles during "cold" braking is known to cause more rapid brake wear, and is to be avoided where possible.

In addition, known aircraft braking systems that are designed to reduce brake wear continuously monitor the brake usage using sensors to detect brake parameters. An estimated brake usage is determined and stored for use by ground personnel, but the system only monitors and provides data of brake usage; there exists a need for a system that monitors and controls the factors causing brake wear.

Selective brake disabling is also known to reduce carbon brake wear on aircraft. Brake disabling or selective brake operation involves the application of less than the total number of available brakes during taxiing of the airplane. Using such a system, different brakes may be disabled based on a straight forward brake application counter. Additionally, in order to control taxi speed and as well as turning the aircraft, multiple low intensity brake applications, or "snubs," are used. To avoid multiple taps of the brakes, gentle braking may also be continuously applied, dragging the braking during taxiing. These strategies are inefficient from a fuel consumption standpoint and wear the brakes quicker, and are thus generally to be avoided.

Another technique to reduce carbon brake wear is to allow the aircraft's taxi speed to increase from below target speed to well above target speed, and then a single firm brake application is used to decelerate the aircraft well below the target speed. The brakes are then released to enable the aircraft to increase speed again and repeat the whole process again, rather than applying brakes naturally when braking is necessary. This technique has many drawbacks, such as incompatibility with airport layout, complications due to the number of taxi turns, and safety concerns resulting from traffic volume. It would be therefore desirable to provide a system and method that allows the brake to be applied as often as necessary in a low-wear condition.

These methods select or control wheel braking based on measured conditions such as aircraft speed, braking pressure, temperature, etc., but do not rely on the specific brake's optimal characteristics such as the preferred operating brake temperature range provided by the brake manufacturer. Incorporating such information would improve the performance of the brakes and reduce wear comparted with present methods. It would therefore be desirable to provide a system and method which uses such intrinsic brake characteristics to control wheel braking to better optimize carbon braking efficiency.

SUMMARY OF THE INVENTION

The present invention serves to reduce brake wear and increase brake life by affecting the abrasiveness of the carbon-on-carbon interface during the brake operation. The braking system of the present invention introduces, through capture or injection, a friction adjusting material such as a carbon powder between the carbon brake discs from a period when the brakes are initially applied until the brakes are adequately heated. The friction adjusting material serves to lubricate the mating carbon surfaces during the initial phase of taxiing, minimizing temperature induced frictional wear at the surface layers.

The use of carbon powder as a friction adjusting material reduces carbon brake wear by providing small particles between the brake discs that act as a buffer between the brake discs. Moreover, when carbon powder (e.g., graphite and graphene) or small particles are used at brake application, such use reduces the effective roughness of the carbon surface and reduces the tendency for large particles to break off of the carbon disc surface during non-optimum temperature contact, thereby reducing brake wear.

In order to place the powder in the brake stack, the material may be injected from a reservoir adjacent the braking surfaces mounted on a stationary portion of the brake assembly. An injector dispenses the friction adjusting material through insufflation into the brake disc stack, between the rotor discs and the stator discs. The injector may include a mechanical means such as a bellows or other device that receives commands when to insufflate powder into the brake stack. In the case of the bellows, the retraction of a piston could draw up the carbon brake dust from the reservoir and the extension of a piston could dispense friction adjusting material.

In another embodiment, the friction adjusting material is routed through passages in the torque tube and injected at the top of the torque tube keyway 203. The stator contains a spiral grove (not shown) on at least one friction surface and aligned with the top of the keyway surface to dispense friction adjusting material between the discs.

Another use of the insufflation device could be to continually blow cooling air between the discs.

Alternatively, keyways on the brake's torque tube may include a narrow grove running the length of the keyway's inner diameter surface and countersunk toward holes along the keyway. In addition, to advantageously increase the collection of the spent carbon dust at the keyways, a groove is placed on at least one friction surface of the stator plate, just above the keyways.

The spent friction adjusting material, such as graphite and graphene, may be captured for reuse such as by electromagnetic collectors that direct the carbon to a retaining vessel. Alternatively, the friction adjusting material may be centripetally or gravitationally collected in reservoirs for use with systems that dispense the friction controlling agent. Commands from the brake pedals and/or the brake control system may be used to initiate the collection/reclamation, or dispensing of the spent friction adjusting material. The collection of the particulate also reduces that amount of particulate matter that is introduced into the runway or the airport environment in general.

Brake wear and/or brake wear prognostics may also be used to select which brakes are applied during light to medium braking when there are no substantive safety issues. Additionally, the braking wear system may use the nose wheel steering position to determine which brakes to apply to reduce tire wear and scrubbing. In one preferred aspect of the invention, varying brake pressure levels based on brake wear, nose wheel steering position, brake temperature and other factors are advantageously used to control brake wear and intentional brake heating within the brake system.

In one aspect of the present invention, adaptive braking (i.e., selecting which brakes to apply) may be used in conjunction with, for instance, application of carbon powder to the carbon brake surfaces to further reduce carbon brake wear. When brakes are applied in response to brake commands that are based on multifactorial conditions, brake wear can be minimized. Such conditions may include, for example, aircraft speed, aircraft deceleration rate, aircraft weight, brake temperature, brake command, braking pressure, taxiway patterns at the airport, brake characteristics by manufacturer, tire pressure, taxi speeds, brake wear, skid conditions and wear rate. With adaptive braking, a plurality of brake characteristics can be used at the same time, allowing for mixing brake manufacturers on an aircraft. Brakes can be automatically applied to maintain taxiway speed limits and optimal brake temperatures. Adaptive braking can be used to balance brake wear, balance brake energy, and provide prognostic data for maintenance. Balancing brake wear involves adjusting braking so that the plurality of carbon brake stacks wear evenly when conditions allow.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
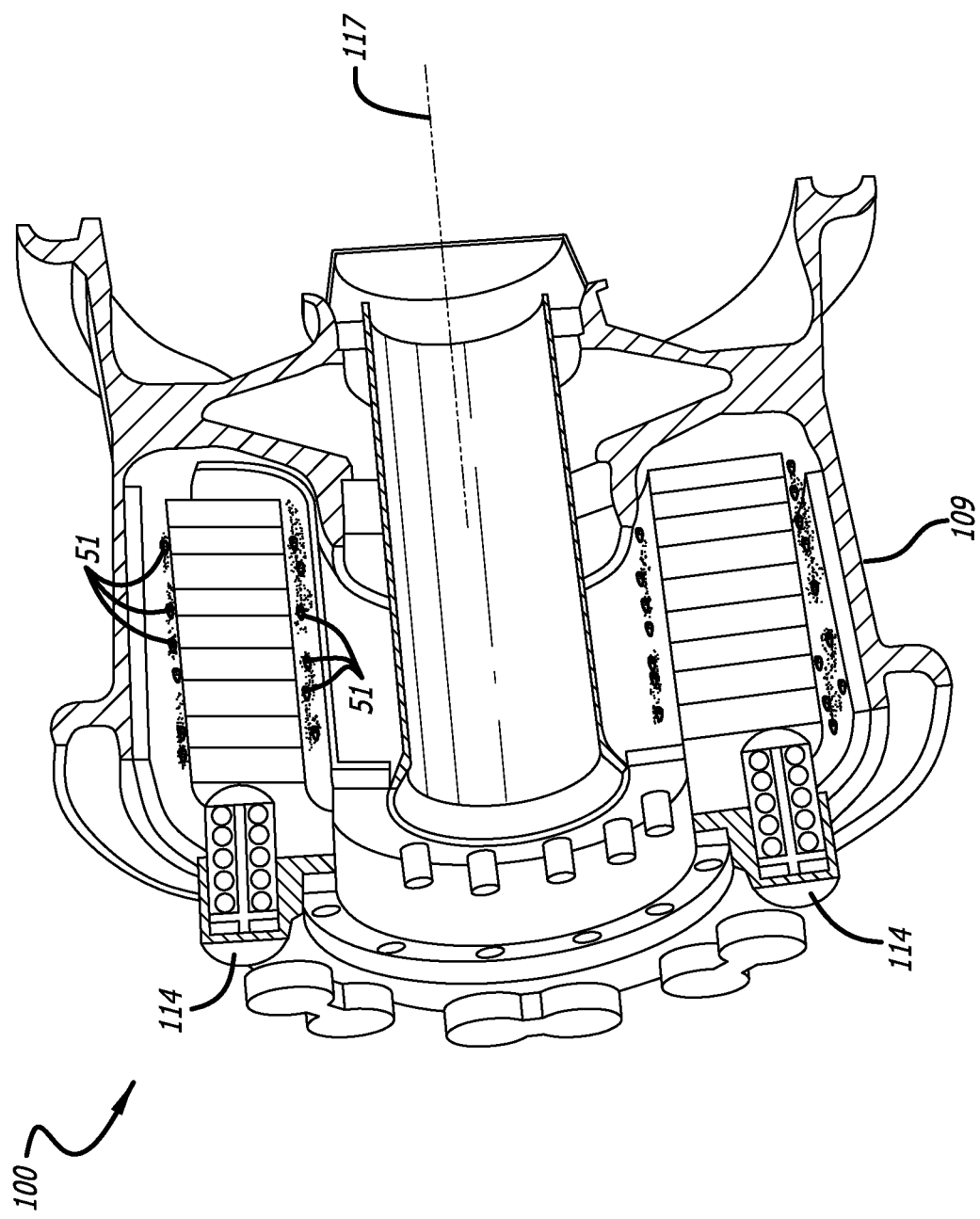
FIG. 1 is a perspective view of a prior art wheel and carbon brake assembly for an aircraft.

A prior art aircraft wheel and brake assembly 100 is shown in FIG. 1, where a wheel 109 encompass a plurality of discs of the brake assembly mounted along a centerline 117, that cooperate to arrest the velocity of the aircraft under the influence of an actuator 114. Carbon brakes generally comprise a piston housing 202 including pistons, a torque tube, and a carbon brake stack. The carbon brake stack is made up of several discs (stators) that are keyed to the stationary torque tube, and interleaved discs (rotors) that are keyed to the inside rim of the wheel and rotate with the wheel. The stack is bounded by the piston housing 202 and a pressure plate 205 on one side, and a backing plate 204 on the other side that compress the stators and rotors. During the interaction of the discs, particles 51 that can prematurely wear the discs are dislodged around the inner and outer diameter of the discs. Most of the particles 51 eventually get expelled from the brake assembly 100 and are jettisoned from the wheel housing 109 into the atmosphere.

Figure 2:
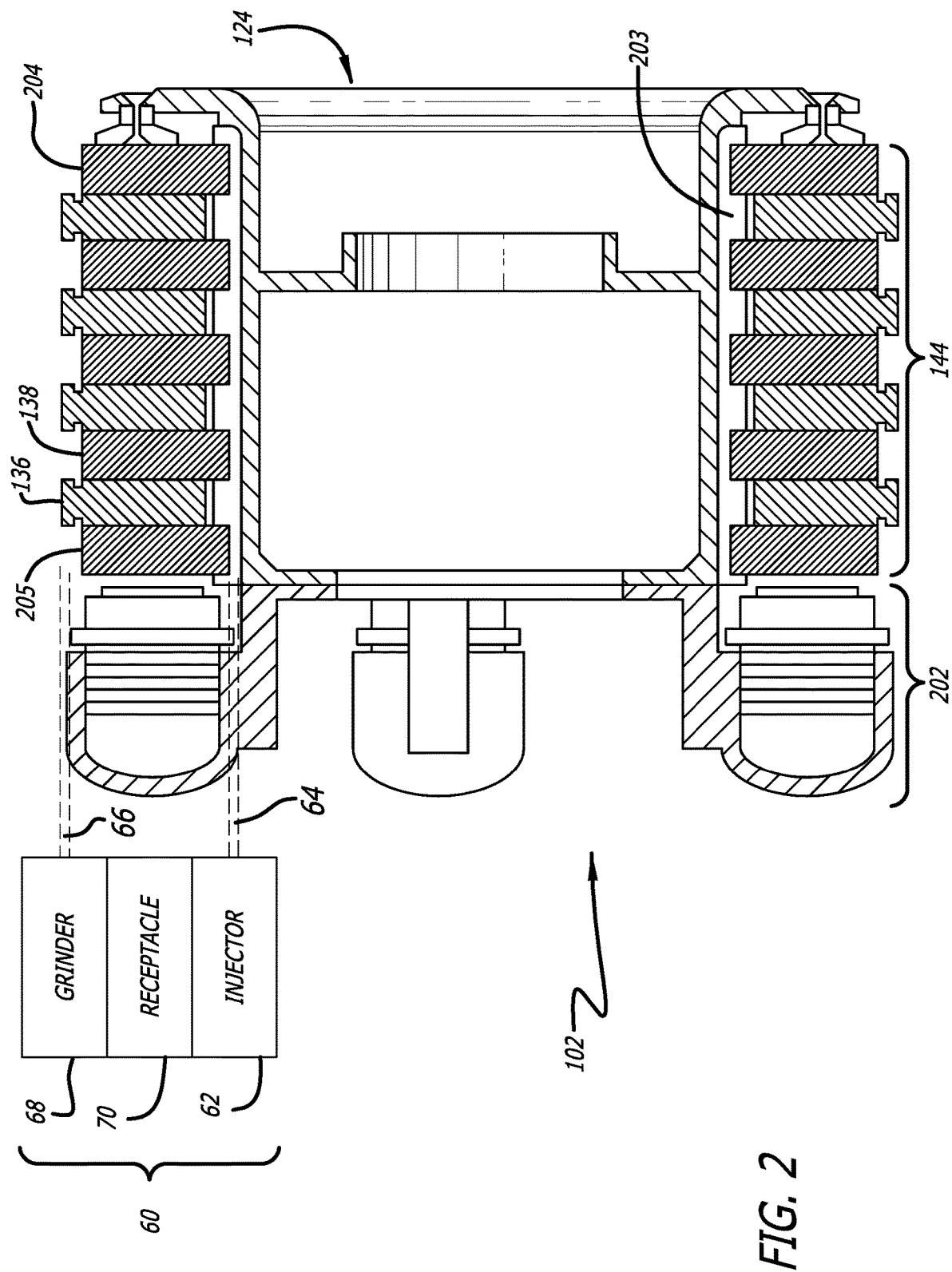
FIG. 2 is a cross sectional view of the carbon brake assembly of the present invention.

Referring to FIG. 2, a cross sectional view of the braking assembly of the present invention is shown. The aircraft brake assembly 102 includes a piston housing 202 having a plurality of actuators 114, a brake stack 144 and torque tube 124.

Figure 3:
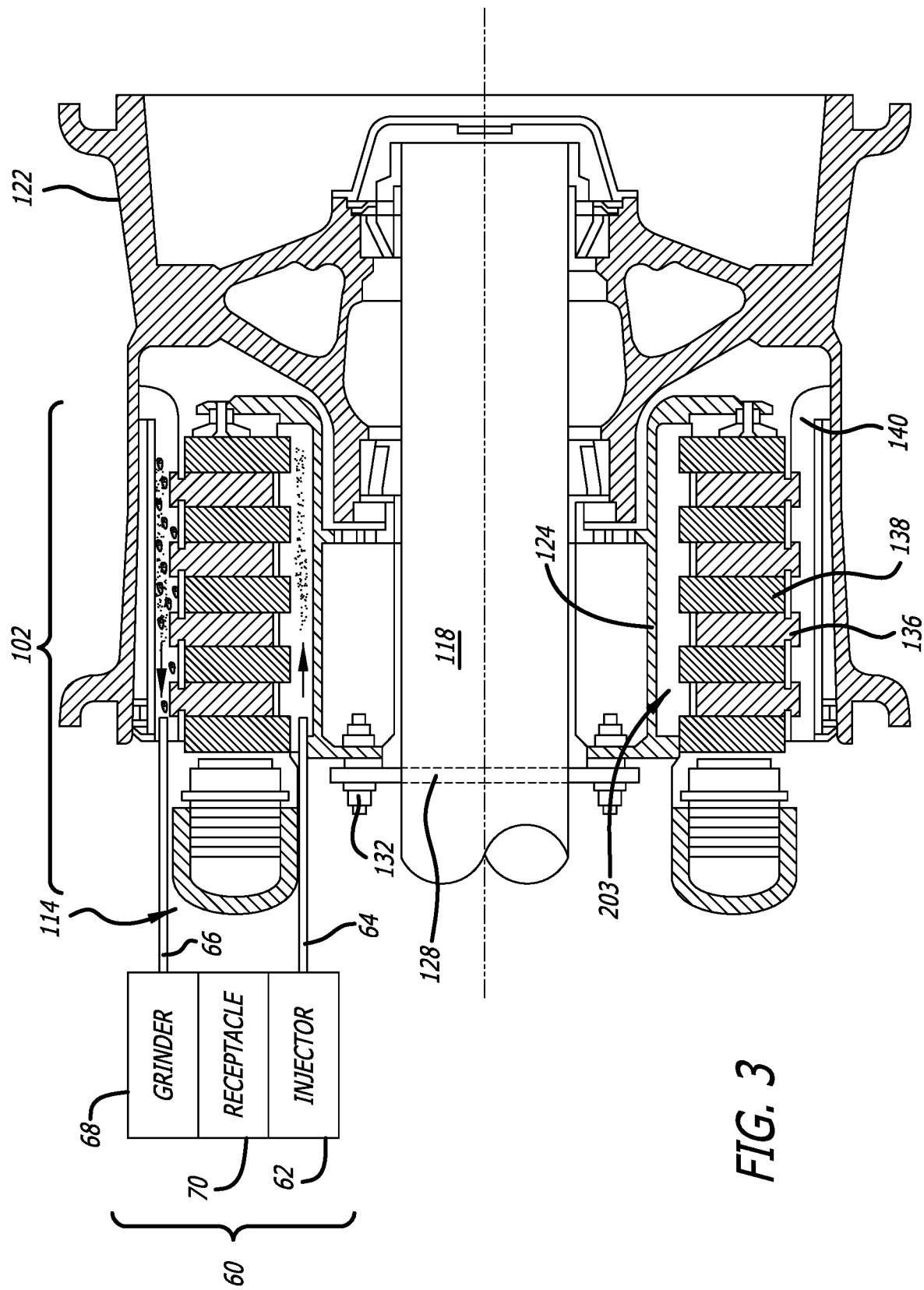
FIG. 3 is a cross sectional schematic view of the wheel and carbon brake assembly of the present invention.

Referring to FIG. 3, a cross sectional view of the wheel and carbon brake assembly of the present invention is shown. The aircraft brake assembly 102 is coupled to the axle flange 128 via, for example, brake bolts 132. The actuators 114 in the piston housing 202 are configured to engage and disengage the brake stack 144, which includes the alternating rotor discs 136 and stator discs 138. The rotor discs 136 are engaged by wheel 122 via, for example, rotor drive keys 140, and the stator discs 138 are engaged by the torque tube keys 203.

A preferred embodiment of the present invention allows for the use of carbon powder as a lubricant between the wheel brake discs to further reduce brake wear. In one exemplary embodiment, each wheel brake includes one or more powder dispensers 60 mounted proximal to the wheel brake. The powder dispenser 60 is preferably mounted on or adjacent to a carrier assembly (not shown) of the wheel brake with access to the surfaces between the rotor discs 136 and stator discs 138, but may alternatively be mounted adjacent to the wheel brake such as on the axle 118. The powder dispenser 60 may include an injector 62 and a receptacle 70 containing carbon powder, at least one outlet 64 for dispensing of carbon powder to the surfaces between one or more brake discs, an inlet 66 for receiving carbon particles broken off from the surfaces during braking of the aircraft, and a grinder 68 for grinding the larger carbon particles into a powder for placement into the receptacle 70. The powder dispenser 60 may be electrically connected to the brake actuation controller 26 (FIG. 3) to activate in response to a brake command 38 or other aircraft braking condition 28.

In one method of use, a braking actuator controller 26 receives a brake command from the pilot or autobrake system, and actuates one or more of the wheel brakes 10A, 10B. This in turn causes a piston to compress the brake stack 144. When braking is released and the rotors and stators' surfaces move apart, any carbon particles that are created are removed through the inlet 66 (via vacuum or other methods) and transferred to the powder receptacle 70. This particulate may be further pulverized in the grinder 68 before transference to the receptacle 70. Consequently, when braking is reengaged the abrasive condition of the brake disc stack is reduced due to the removal of the large carbon particles, resulting in less brake wear while the receptacle 70 and grinder 68 are shown as a source for the powder to be applied at the surface of the brakes from injector 62.

The aforementioned description of the mechanism and placement of the powder dispenser 60 indicates one presently preferred embodiment, and is not intended to be limited to any specific mechanism or placement. For example, mechanisms other than a vacuum for receiving carbon powder, or a pump for spraying carbon powder, may be used for the powder dispenser 60 while keeping the spirit and scope of the invention. Additionally, placement of the powder dispenser 60 with respect to the brake stack 144 may occur other than on the carrier assembly or axle. Moreover, while the above-described embodiment describes use of a single powder dispenser for a brake stack, multiple powder dispensers may be used for a single wheel brake. For example, each powder dispenser 60 may be placed such that its outlet 64 corresponds to a single pair of rotors 136 and stators 138. Alternatively, a single powder dispenser with multiple outlets 64, each corresponding to a single pair of rotors and stators, may be used.

The powder dispenser 60 preferably applies a carbon powder to the surfaces of the brake discs before the brake stack is compressed by the pistons. For example, after a brake command is received into the brake actuator controller, but before the brake stack is compressed, the braking actuator controller 26 activates the powder dispenser 60. The rotors 136 and stators 138 surfaces are disengaged and apart at this time. Carbon powder in the receptacle 70 is injected through the outlet 64 and injected to the inner surface of one or more of the brake discs. For example, the powder dispenser 60 may inject the powder onto the friction surface of each rotor while it turns to fully coat its surface. The powder dispenser 60 may also spray a weak adhesive from a separate reservoir (not shown) before, during, or after dispensing the carbon powder to facilitate retention of the powder on the brake discs. Consequently, when the braking actuator controller 26 subsequently actuates the wheel brakes, the abrasive condition of the brake disc stack is reduced due to the addition of the small carbon particles or carbon powder, further resulting in less brake wear.

Figure 4:
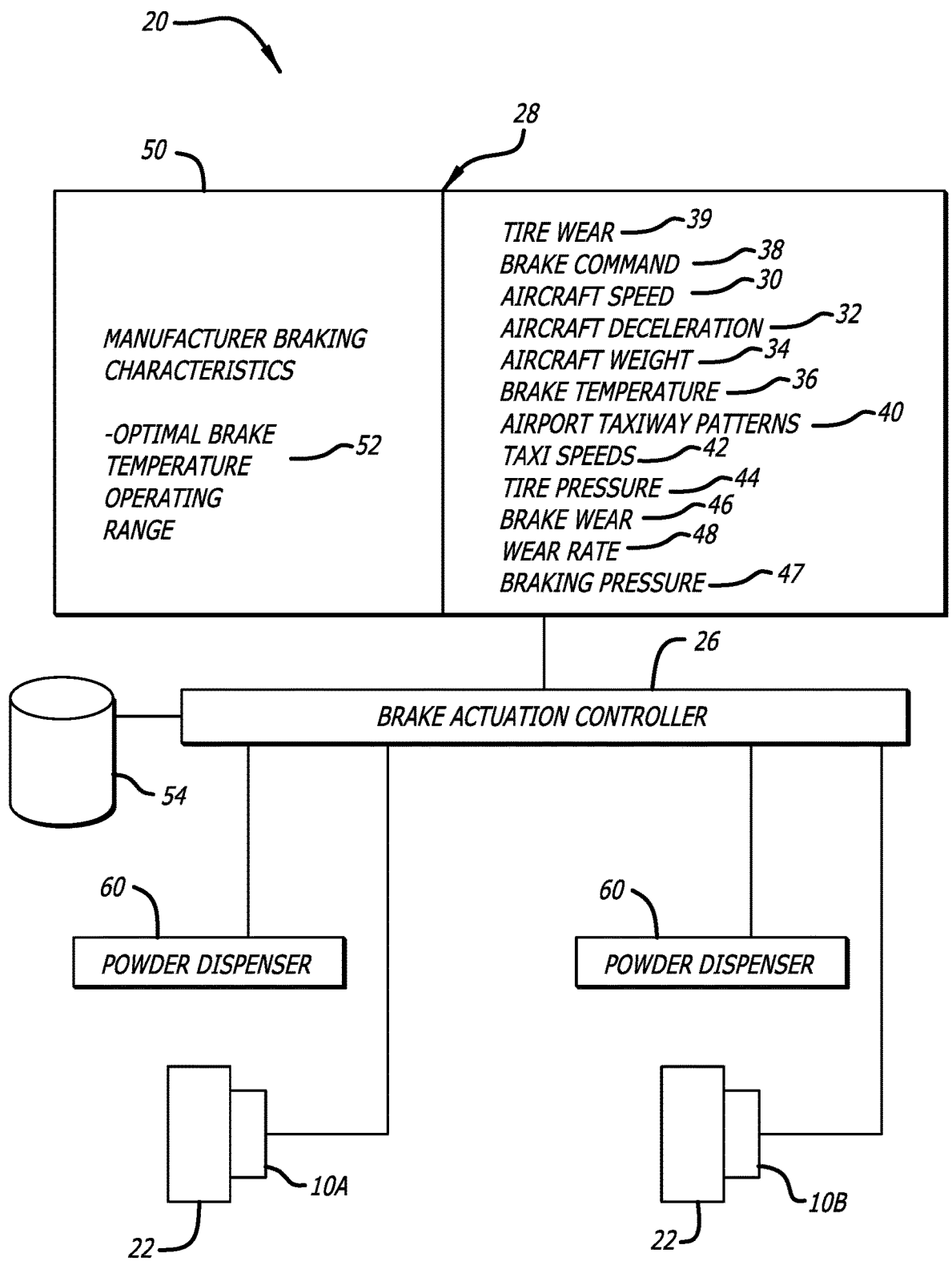
FIG. 4 is a schematic diagram of a powder injector/dispenser control system.

In FIG. 4, the brake discs engage in response to a brake command 38, which is monitored by the brake actuation controller 26. The brake command 38 may be initiated for example, by actuation of a brake pedal by a pilot or an autobrake system. Once the brake command is received, the brake actuation controller 26 monitors for one or more aircraft braking conditions 28, in response to which the brake actuation controller actuates the plurality of wheel brakes 10A, 10B at wheels 22. These conditions 28 may include, but are not limited to, aircraft speed 30, aircraft deceleration 32, aircraft weight 34, brake temperature 36, airport taxiway patterns 40, taxi speeds 42, tire pressure 44, brake wear 46, wear rate 48, tire wear 39, and braking pressure 47. Monitoring the aforementioned conditions is accomplished based upon the knowledge of one of ordinary skill in the art; for example, a wheel speed transducer (not shown) may be provided near the wheel brake to receive wheel speed data which is transmitted to the brake actuation controller, and the brake actuation controller processes this data to derive the aircraft speed 30. Using this data, the brake actuation controller 26 disables one or more of the wheel brakes 10A, 10B in response to the one or more aircraft braking conditions also according to the knowledge of one of ordinary skill in the art. For example, the brake actuation controller may instruct one of the wheel brakes not to apply braking dependent upon the aircraft speed in combination with other conditions 28.

In a preferred embodiment of the present invention, one of the aircraft braking conditions includes manufacturer braking characteristics 50. Here, each wheel brake 10A, 10B on an aircraft may be of a different manufacturer, and the brake actuation controller 26 disables one or more of the wheel brakes 10A, 10B in response to the manufacturer braking characteristics. An example of a manufacturer braking characteristics 50 is an optimal brake temperature operating range 52 for that wheel brake. In one exemplary embodiment, the braking actuation controller 26 communicates with a database 54 of manufacturer brake characteristics including the optimal brake temperature operating range 52 for each wheel brake of each aircraft, and selectively disables the wheel brakes 10A, 10B depending upon the brake temperature 36 sensed.

For example, when the brake actuation controller monitors and receives the brake temperature 36 of each wheel brake, it compares the brake temperature against the database 54 to determine whether a wheel brake falls outside its optimal brake temperature operating range, and if so, disables that brake 10A or 10B accordingly. This characteristic, as well as other manufacturer braking characteristics 50 stored in the database 54, may be used in combination with the sensed aircraft braking conditions by the brake actuation controller to perform adaptive braking according to the knowledge of one of ordinary skill in the art, while further allowing for the use of wheel brakes by different manufacturers for an aircraft which was generally not present in conventional adaptive braking techniques, in order to balance and reduce brake wear.

Figure 5:
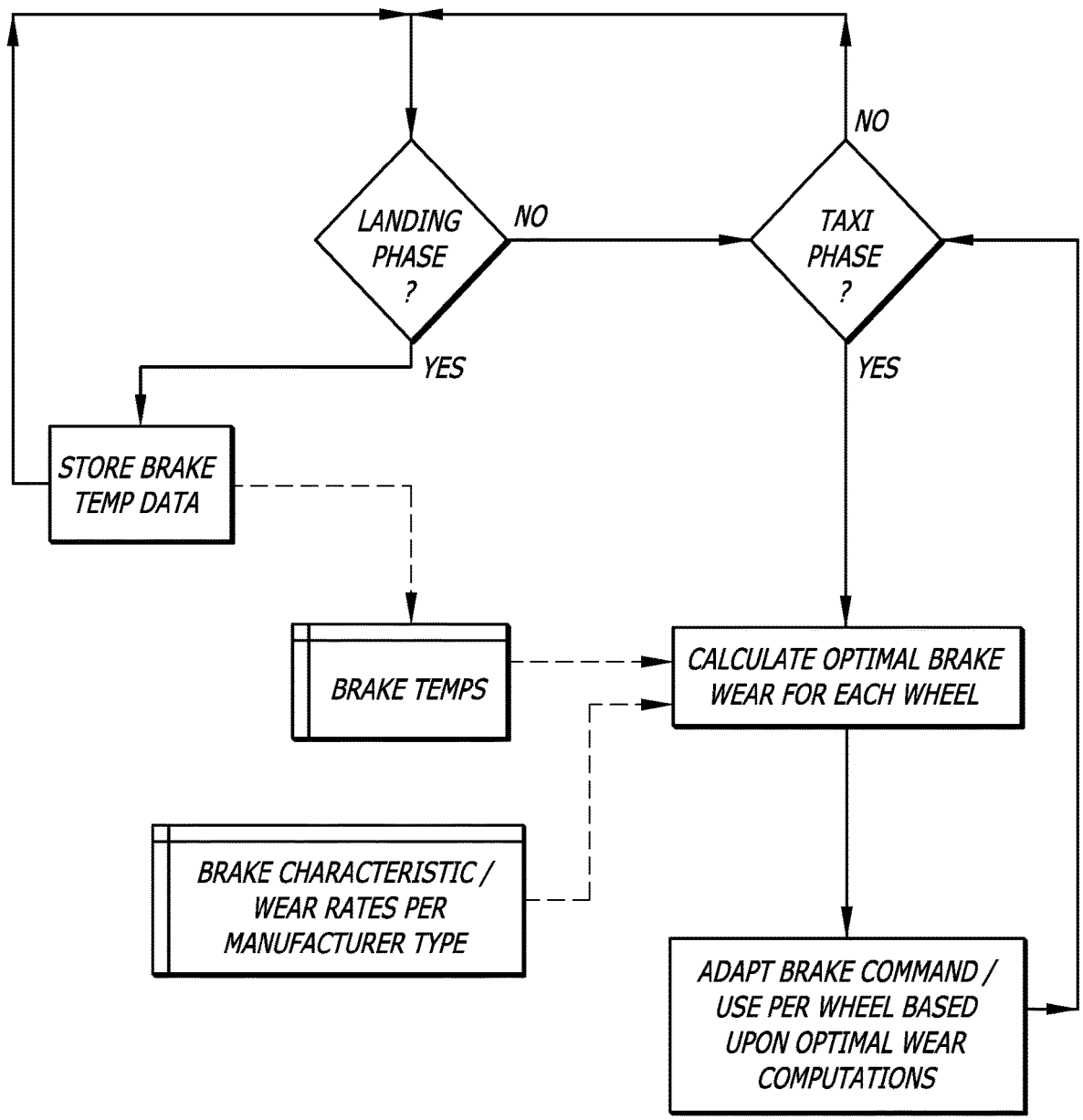
FIG. 5 is a flow diagram of a logic for applying brake commands based on optimal wear conditions.

FIG. 5 illustrates an exemplary flow diagram for conducting a braking operation using the present invention. The brake characteristic/wear rates for each brake manufacturer is input in order to determine an optimal brake wear characteristic for each wheel. This optimal brake wear is then input into a controller that uses the input to issue an adaptive brake wear command for each wheel. If the aircraft is in taxi mode the brake command is issued and the brakes are applied accordingly. If the aircraft is in a landing phase, the brake temperature data is determined and stored in a brake temperature memory. This temperature is then recalled along with the current brake temperature when the aircraft is in taxiing mode in order to determine the correct brake command for each manufacturer's brake.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed:

1. A system for monitoring and controlling braking for an aircraft to reduce brake wear, the aircraft including a plurality of wheel brakes each having a plurality of brake discs which engage to decelerate the aircraft in response to a brake command, the system comprising:
a brake actuation controller configured to monitor for a brake command and to actuate one or more of the plurality of wheel brakes in response to the brake command; and
a powder dispenser mounted with respect to each of the plurality of wheel brakes and configured to receive particles of carbon or apply carbon powder between the plurality of brake discs, the powder dispenser comprising a receptacle for containing carbon powder, an outlet for dispensing carbon powder to one or more surfaces of the plurality of brake discs, an inlet for receiving broken off carbon particles from the surfaces of the plurality of brake discs by vacuum, and a grinder for grinding the broken off carbon particles into a powder and placement into the receptacle.

2. The system of claim 1, wherein the brake actuation controller is configured to monitor for one or more aircraft braking conditions and is configured to disable one or more of the wheel brakes in response to the one or more aircraft braking conditions.

3. The system of claim 2, wherein the one or more aircraft braking conditions are selected from the group consisting of aircraft speed, aircraft deceleration, aircraft weight, brake temperature, brake command, airport taxiway patterns, taxi speeds, tire pressure, tire wear, brake wear, and wear rate.

4. The system of claim 3, wherein the brake actuation controller is configured to communicate with a database storing manufacturer braking characteristics for each of the plurality of wheel brakes, and wherein the brake actuation controller is configured to disable one or more of the wheel brakes based on the manufacturer braking characteristics.

5. The system of claim 4, wherein the manufacturer braking characteristics include an optimal brake temperature operating range for each of the plurality of wheel brakes, wherein the one or more aircraft braking conditions is the brake temperature, and wherein the brake actuation controller is configured to adjust brake pressure to one or more of the wheel brakes if the brake temperature falls outside the optimal brake temperature operating range.

6. The system of claim 1, wherein the powder dispenser is mounted on a carrier assembly of each wheel brake.

7. The system of claim 1, wherein the powder dispenser is mounted on an axle adjacent to each wheel brake.

8. The system of claim 2, wherein the brake actuation controller is configured to activate the powder dispenser in response to the one or more aircraft braking conditions.

9. The system of claim 1, wherein the plurality of brake discs include multiple pairs of rotors and stators, and the powder dispenser includes a plurality of outlets each for individually dispensing carbon powder to each pair of rotors and stators.

10. The system of claim 1, wherein the brake actuation controller is configured to activate the powder dispenser in response to the brake command.

11. A method of monitoring and controlling braking of an aircraft to reduce brake wear, the aircraft including a plurality of wheel brakes each having a plurality of brake discs which engage to brake the aircraft in response to a brake command, the method comprising the steps of:
monitoring for a brake command and actuating one or more of the plurality of wheel brakes in response to the brake command; and
spraying carbon powder of a predetermined size from a receptacle through an outlet of a powder dispenser onto one or more surfaces of the plurality of brake discs.

12. The method of claim 11, wherein the step of spraying carbon powder of a predetermined size includes:
vacuuming carbon particles broken off from one or more surfaces of the plurality of brake discs through an inlet of the powder dispenser;
pulverizing the carbon particles with a grinder of the powder dispenser to form a smaller diameter carbon powder than said carbon particles; and
retaining the carbon powder from the grinder in a receptacle of the powder dispenser.

13. The method of claim 11, further comprising activating the powder dispenser prior to actuating one or more of the plurality of wheel brakes.

14. The method of claim 11, wherein the step of spraying carbon powder further includes:
spraying an adhesive from the powder dispenser onto the one of more surfaces of the plurality of brake discs to promote retention of the carbon powder on the brake discs.

15. The method of claim 11, further comprising:
monitoring for an aircraft braking condition and actuating one or more of the plurality of wheel brakes in response to the aircraft braking condition; and
wherein the step of one of receiving particles or dispensing powder occurs in response to the aircraft braking condition.

16. A method of monitoring and controlling braking of an aircraft to reduce brake wear, the aircraft including a plurality of wheel brakes each having a plurality of brake discs which engage to brake the aircraft in response to a brake command, the method comprising the steps of:
monitoring for an aircraft braking condition and actuating one or more of the plurality of wheel brakes in response to the aircraft braking condition; and
spraying powder from a powder dispenser between the plurality of brake discs in response to the aircraft braking condition;
wherein the spraying powder includes vacuuming carbon particles broken off from one or more surfaces of the plurality of brake discs through an inlet of the powder dispenser, pulverizing the carbon particles with a grinder of the powder dispenser to form a carbon powder of a predetermined diameter, and retaining the carbon powder in a receptacle of the powder dispenser.

17. The method of claim 16, wherein the step of spraying powder includes
spraying carbon powder from a receptacle of the powder dispenser through an outlet onto one or more surfaces of the plurality of brake discs; and
spraying an adhesive from the powder dispenser onto the one or more surfaces of the plurality of brake discs to facilitate retention of the carbon powder on the brake discs.

18. The method of claim 16, further comprising a step of blowing cooling air on the brake stack.

* * * * *